United States Patent

Johnson et al.

[11] Patent Number: 5,855,720
[45] Date of Patent: Jan. 5, 1999

[54] CLAMPING HEAD FOR USE IN JOINING PLASTIC EXTRUSIONS AND METHOD THEREOF

[76] Inventors: Orin S. Johnson, Route 1, Box 95; Gary A. Jones, Route 1, Box 122, both of Hayfield, Minn. 55940

[21] Appl. No.: 842,006

[22] Filed: Apr. 23, 1997

Related U.S. Application Data

[63] Continuation-in-part of Ser. No. 614,530, Mar. 13, 1996, abandoned.

[51] Int. Cl.⁶ .................................................. B29C 65/14
[52] U.S. Cl. ................... 156/272.2; 156/282; 156/304.2; 156/304.6; 156/359; 156/498
[58] Field of Search ................................ 156/272.2, 282, 156/304.2, 304.6, 359, 379.6, 499, 503, 267, 498

[56] References Cited

U.S. PATENT DOCUMENTS

| | | |
|---|---|---|
| 2,972,371 | 2/1961 | Hermann et al. . |
| 3,186,891 | 6/1965 | Gelling et al. . |
| 4,197,149 | 4/1980 | Freitag et al. ...................... 156/282 X |
| 4,239,574 | 12/1980 | Aust et al. . |
| 4,640,732 | 2/1987 | Stafford . |
| 4,752,350 | 6/1988 | Schuster . |
| 4,909,892 | 3/1990 | Quinn et al. . |
| 4,960,478 | 10/1990 | New kirk et al. . |
| 4,995,935 | 2/1991 | Ganzberger . |
| 5,006,198 | 4/1991 | Pasquini . |
| 5,241,157 | 8/1993 | Wermelinger et al. .......... 156/304.2 X |
| 5,328,541 | 7/1994 | Usui et al. ........................ 156/304.6 X |
| 5,599,419 | 2/1997 | Hunter et al. . |

FOREIGN PATENT DOCUMENTS

| | | |
|---|---|---|
| 0 754 329 | 10/1970 | Belgium . |
| 0312712 | 4/1989 | European Pat. Off. . |
| 2 088 220 | 3/1990 | Japan . |

*Primary Examiner*—Michael W. Ball
*Assistant Examiner*—Sam Chuan Yao
*Attorney, Agent, or Firm*—Merchant, Gould, Smith, Edell, Welter & Schmidt, P.A.

[57] ABSTRACT

An apparatus and method for creating a flash-free weld between the ends of thermoplastic members, wherein the members are held in position by holders, the ends of the members are softened by a heater, the members and holders are brought together until the ends of the members are joined to result in a flash-free weld.

19 Claims, 9 Drawing Sheets

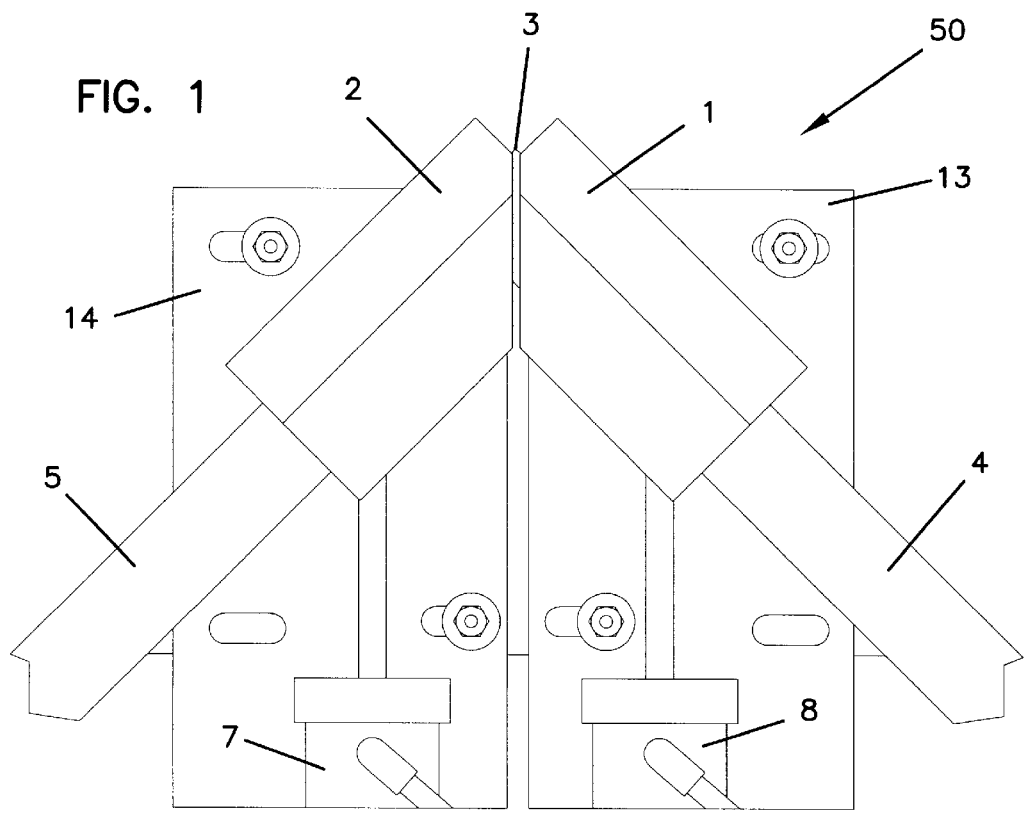
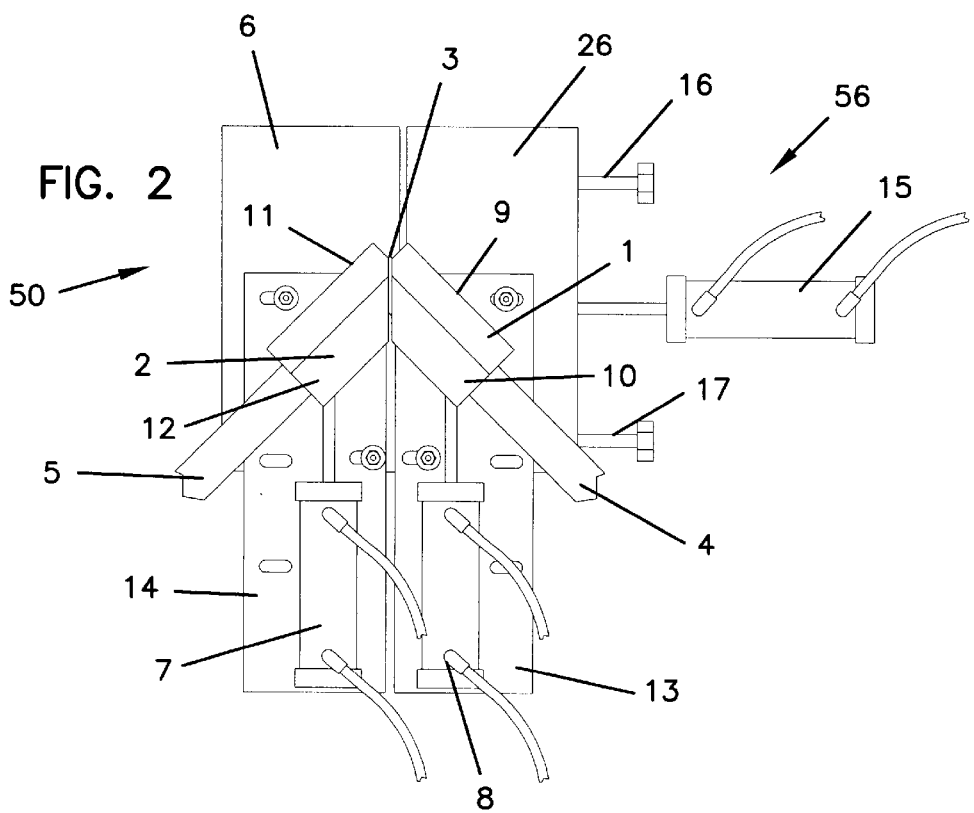

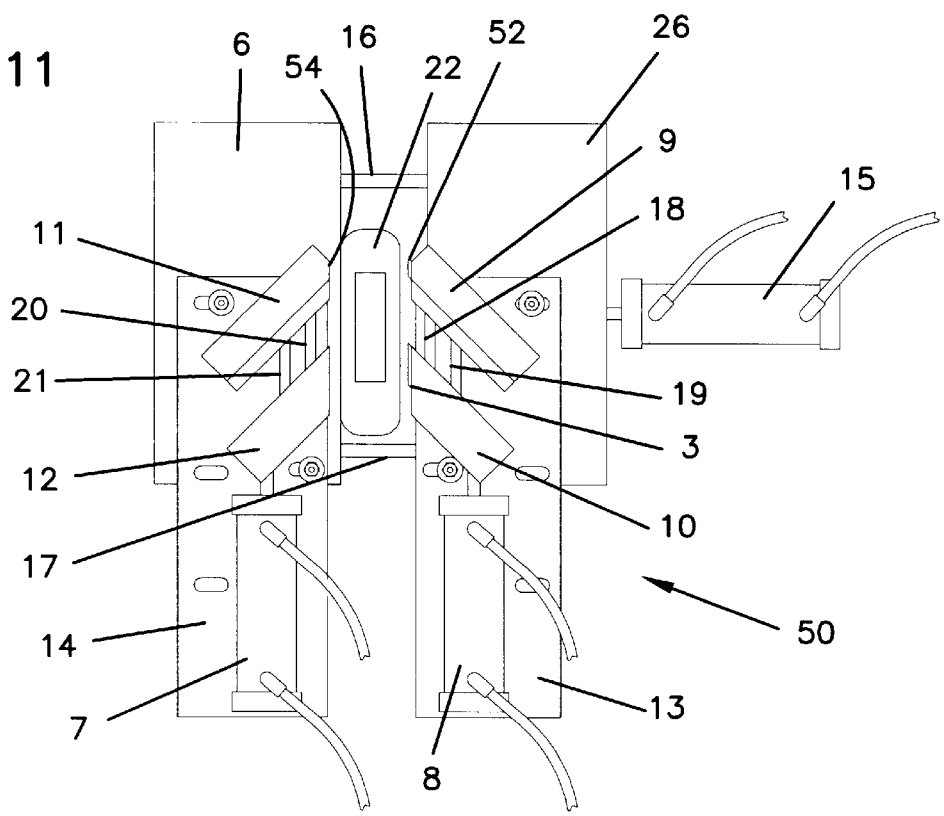
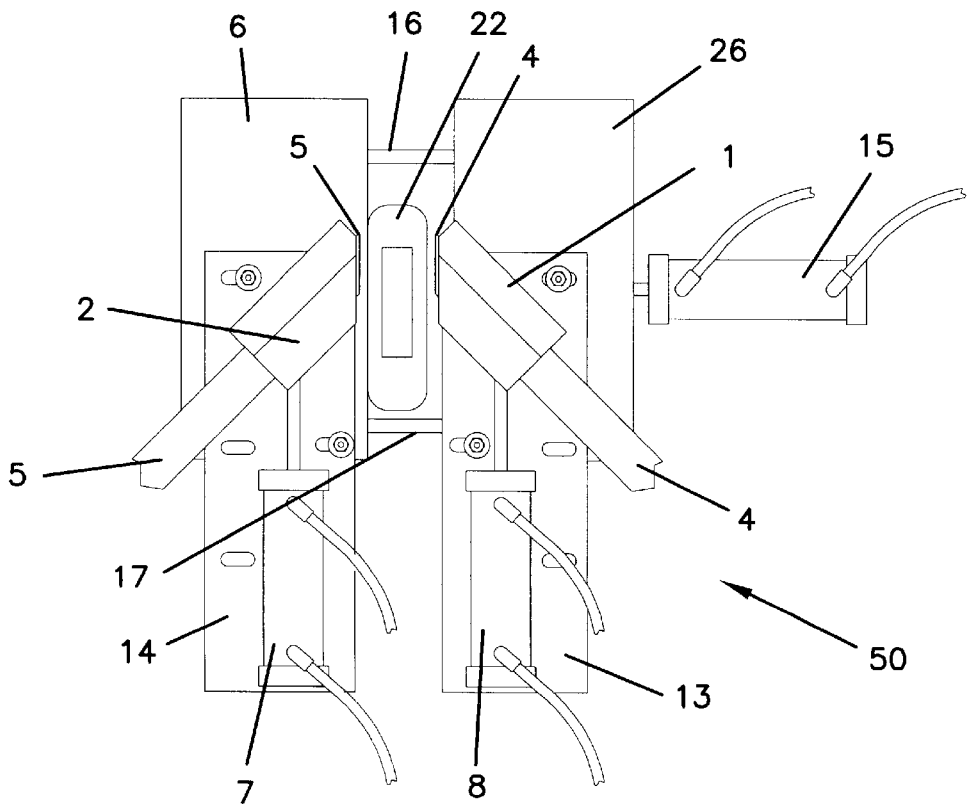

CLAMPING HEAD FOR USE IN JOINING PLASTIC EXTRUSIONS AND METHOD THEREOF

This application is a continuation-in-part of application Ser. No. 08/614,530, filed on Mar. 13, 1996, now abandoned hereby incorporated by reference.

BACKGROUND OF THE INVENTION

1. Field of the Invention

This invention relates in general to an apparatus and process for welding thermoplastic members, and more particularly, to an apparatus and process for creating a substantially flash-free weld.

2. Description of Related Art

In order to weld thermoplastic members, to be used in window or door frames, for example, machines are known in which the thermoplastic members are clamped, the ends of the members are softened by a heating plate, and the softened ends are joined. The resulting flash can be removed while the joint is still warm or machined off after the joint has cooled. If the flash is to be removed after the joint has cooled, the welded members are removed from the welding apparatus and then placed in a second machine in which a router, grinder, or knife blade is used to remove the flash. Depending on the profile of the member, e.g., the inside surface where the window glass will rest, an additional step of removing some of the flash by hand may be necessary. Still other systems choose to remove the flash from the entire profile by hand.

If the flash is removed while still warm, deformation in the zone of the weld may result. To prevent this deformation, other systems, such as that disclosed in U.S. Pat. No. 4,239,574, use a two-step process of first, pinching the flash, and second, manually dragging a scraper around the edges of the joint to remove the remaining flash. The '574 patent discloses a guide means to guide the scraper around the area of the weld, but the actual removal of the flash is not caused by the clamping head, but by a manual scraper. All these systems require additional time, effort, and apparatus to remove the flash after the weld is formed.

SUMMARY OF THE INVENTION

To overcome the limitations in the prior art described above, and to overcome other limitations that will become apparent upon reading and understanding the specification, the present invention discloses an apparatus and process to create a flash-free weld for thermoplastic members.

The present invention solves the above-described problems by providing a clamping head with which thermoplastic members are heated by radiant heat so that the ends of the members are not contaminated, thereby avoiding the necessity of generating flash to dispose of the contaminated thermoplastic. Alternatively, the clamping head has one or more cutting edges in the profile of the members that forcefully engage the holders or each other, thus cutting off the flash without deforming the surface of the member.

One embodiment of a clamping head of the present invention includes two holders, each holder having an opening in a face shaped in the profile of a thermoplastic member. The clamping head also includes a moving structure for moving the heads between an open and a closed position. In the open position, the holders are spaced apart. In the closed position, the holders are engaged. The ends of the members are softened by radiant heat from a heater. The heater can be moved toward and away from a position between the two holders.

Another embodiment of the present invention includes providing extensions on the faces of both holders with one or, alternatively, both extensions having a cutting edge, for removing the flash by cutting it with the cutting edge when the holders are brought together.

In one aspect of the above implementation, the holders include two blocks which can be separated to insert or remove a thermoplastic member or welded piece and can be urged together to clamp a member.

In another aspect, the holder includes a channel through which fluid can flow to cool the member after or during heating.

In another embodiment, the holder has a heat shield made using a portion of the holder, the heat shield being connected to the rest of the holder and designed for reducing the amount of heat transferred to portions of the thermoplastic member away from the end to be heated.

One further aspect is a heater having two or more heating zones with each zone having a heating element. One embodiment of this heater includes a peripheral zone for heating a peripheral region of each of the thermoplastic members and an interior zone for heating an interior region of each of the members.

Another embodiment of the invention is directed to a method for creating a flash-free weld by placing a thermoplastic member in each of two holders. The holders each have an opening in their faces in the profile of the corresponding member. The holders are placed in an open position with the holders spaced apart and a heater is provided between the holders. The surfaces of the members are heated by the heater and then the holders are moved together, in the absence of the heater, into a closed position. The heated surfaces of the two members engage to form a weld.

In one implementation of this embodiment, the two holders each have an extension surrounding at least a portion of the opening. One or, alternatively, both of the extensions have a cutting edge. The cutting edge removes the flash as the holders are moved together.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 1 is a top view of an embodiment of a clamping head, according to the invention;

FIG. 2 is a top plan view of the clamping head of FIG. 1 mounted on a moving structure, according to the invention;

FIG. 11 shows a starting position for a method, according to the invention, of using the clamping head of FIG. 1;

FIG. 12 shows a heating position for a method, according to the invention, of using the clamping head of FIG. 1;

DETAILED DESCRIPTION OF THE PREFERRED EMBODIMENTS

Figure 3:
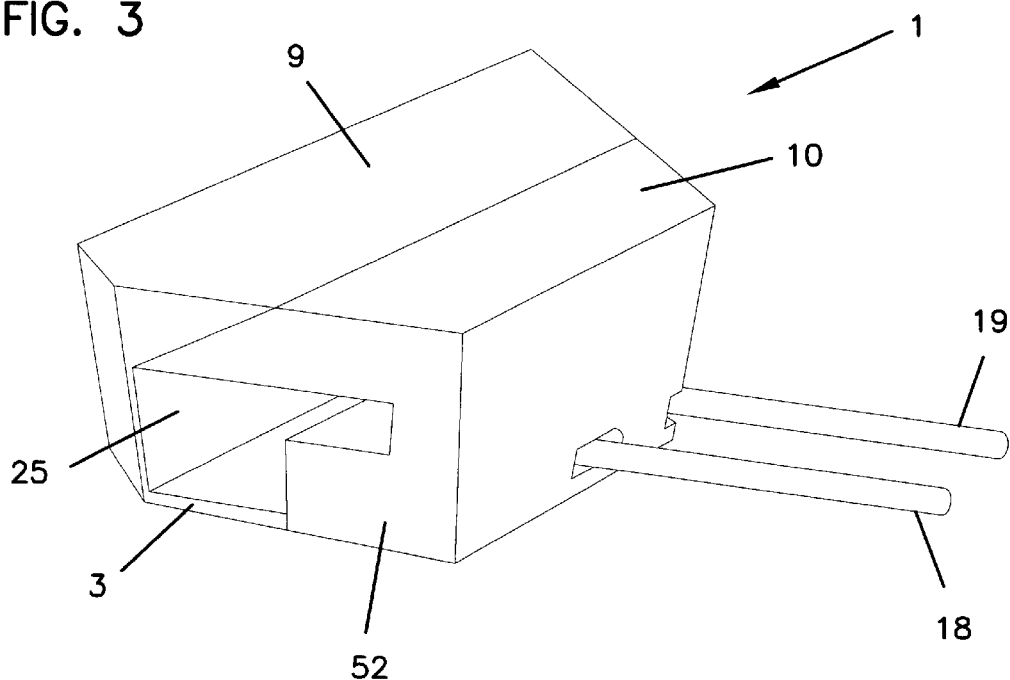
FIG. 3 is a perspective view of an embodiment of a first holder, according to the invention.

In the following description of the exemplary embodiments, reference is made to the accompanying drawings which form a part hereof, and in which is shown by way of illustration of specific embodiments in which the invention may be practiced. It is to be understood that other embodiments may be made without departing from the scope of the present invention.

The present invention is directed to a clamping head and a method for joining thermoplastic members, and in particular, for joining thermoplastic members either by simultaneous deflashing of the weld or by forming a substantially flash-free weld. The term "flash-free" means that any flash arising at the weld site is less than about 1/32" in height above the weld.

The clamping head includes two holders, each holder having a face with an opening in the face corresponding to the profile of the thermoplastic member to be joined. A thermoplastic member is clamped in each holder so that its end is nearly flush with or extending slightly beyond the face of the holder. The holders are positioned with faces opposing one another, and the ends of the members are softened by a heater. The holders are brought together so that the ends of the members touch and become welded.

In one embodiment, the thermoplastic members are clamped in the holder so that the end to be joined is substantially flush with the face of the holder. Using one or more heating zones, the heater provides radiant heat to soften the thermoplastic member. The two holders are brought together, and the weld is formed. Although no particular theory is essential herein, it may be that there is very little flash because the ends of the two members are not contaminated by contact with the heater and thus can be joined without significant loss of material.

In another embodiment, each of the holders has an extension surrounding the opening in the face of the holder. One or, alternatively, both of the extensions have a cutting edge. The thermoplastic members are placed within the holder so that they extend slightly beyond the holder. As the members are welded together, the cutting edge or edges engage either the surface of the other holder or the opposing cutting edge, thus cutting off the flash that forms when the thermoplastic members are welded together.

In this manner, flash-free welds are created without the use of an additional tool to remove the flash from the weld. The surface of the members in the area of the weld is not deformed when the cutting edge cuts the flash because the cutting edge and the openings in the holders are in the profile of the members and thereby support the surface of the members in the area of the weld.

The clamping heads of the present invention are suitable for joining thermoplastic members to form, for example, window frames, door frames, PVC pipe, electrical conduits, raingutters, and flexible moldings for items such as refrigerator and car doors. A wide variety of thermoplastics can be joined using the present invention. One particularly useful thermoplastic is polyvinyl chloride (PVC). PVC can be made in both rigid and soft forms depending on the molecular weight and amount of crosslinking of the polymer, as well as, the existence of copolymers. Other thermoplastics suitable for joining using the invention include, but are not limited to, polyethylene, polypropylene, polystyrene, other polyolefins, polyesters, polyethers, polycarbonate, polytetrafluoroethylene, polyvinylidene chloride, as well as polyvinyls other than polyvinyl chloride. Furthermore, many modern thermoplastic materials are composites and contain items such as wood fibers, sawdust, wheat straw, corn stalks, sand, metal shavings, and/or other organic or inorganic particles which may be used as fillers, but may also impart special characteristics to the thermoplastic material. All of these types of materials are examples of what may be joined using the methods and devices described herein.

Figure 4:
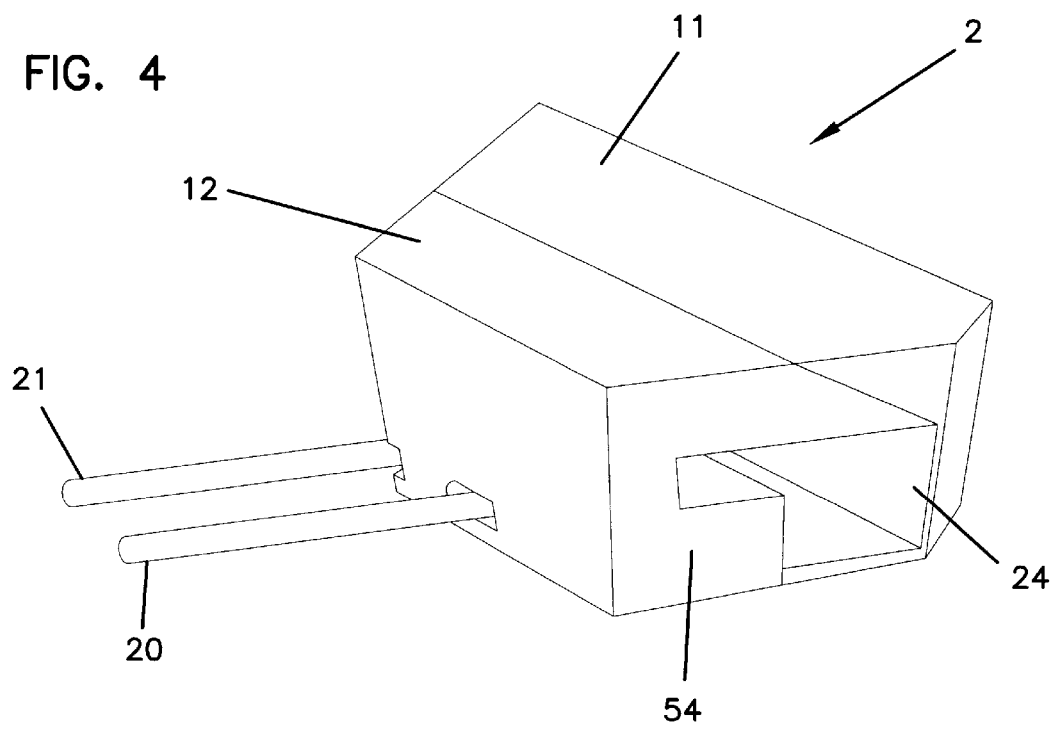
FIG. 4 is a perspective view of an embodiment of a second holder, according to the invention.

With reference to the drawings, in general, and FIGS. 1–2, in particular, a clamping apparatus includes a first holder 1 and a second holder 2. Holders 1,2 are clamped around thermoplastic members 4,5 which are heated and brought together to form a weld. FIG. 3 shows one embodiment of a first holder 1 which has a flat, planar face 52 with an opening 25 flush with face 52 and shaped in the profile of the thermoplastic member to be held. Similarly, second holder 2, shown in FIG. 4, has a flat, planar face 54 with an opening 24 flush with face 54 and shaped in the profile of the thermoplastic member to be held by holder 2.

Figure 5:
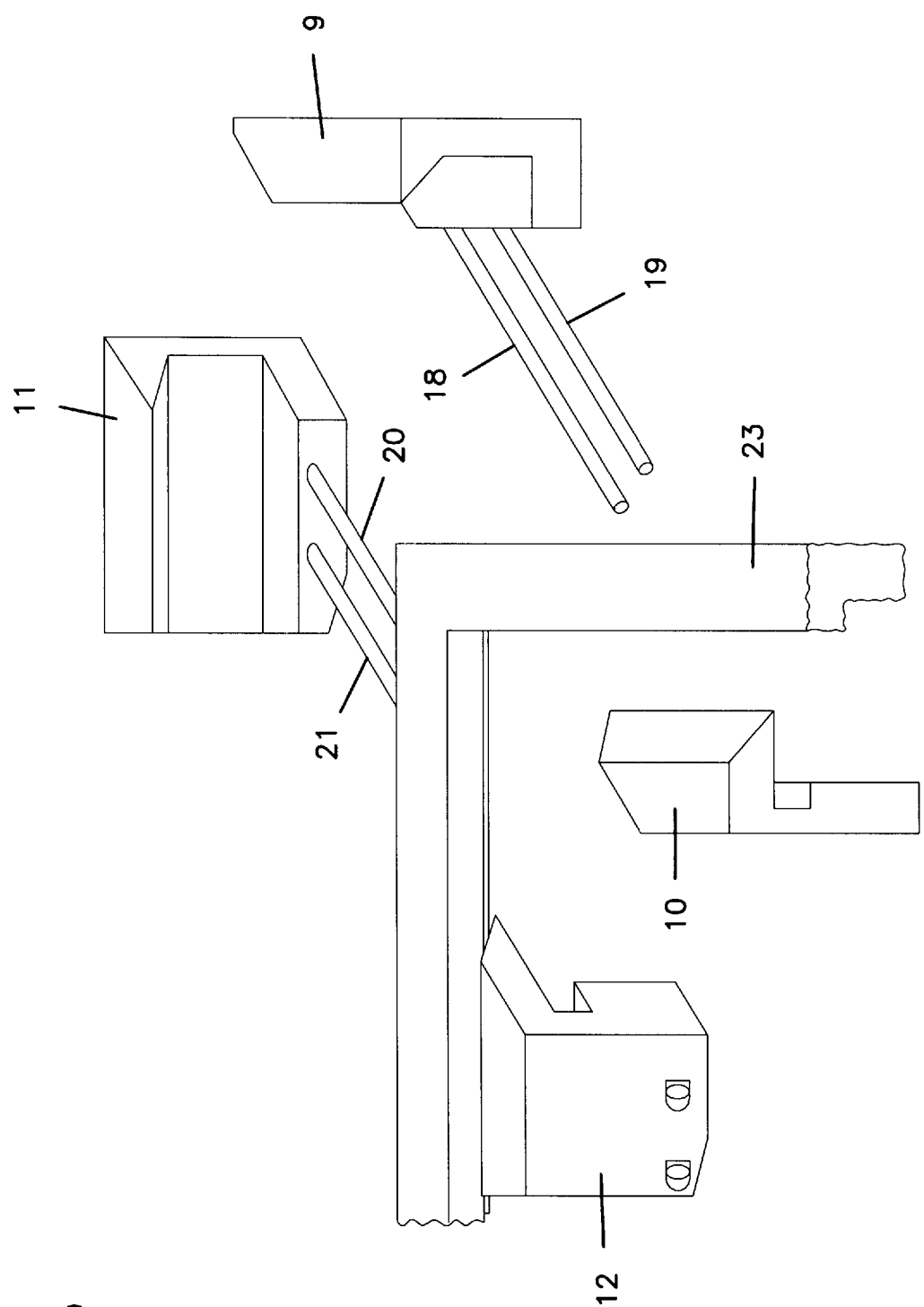
FIG. 5 is a perspective view of expanded holders of FIGS. 3 and 4 separated into blocks for removal or insertion of thermoplastic members or a welded piece.

In one embodiment of the invention, holders 1,2 each have two or more independent sections or blocks. For example, first holder 1 of FIG. 3 has two blocks 9,10 and second holder 2 of FIG. 4 has two blocks 11,12. Blocks 9,10 and blocks 11,12 can be separated, as illustrated in FIG. 5, so that a thermoplastic member or a welded piece 23 can be easily inserted or removed from holders 1,2. Blocks 9,10 and blocks 11,12 are securely clamped together during the welding process to ensure that the thermoplastic members within holders 1,2 do not move. Otherwise, a flawed weld joint may result. Blocks 9,10 and blocks 11,12 are clamped together by, for example, screws, bolts, or clamps.

In one embodiment of the invention, shown in FIG. 2, blocks 9,10 are slidingly mounted on mounting rods 18 and 19 (see FIG. 3) which are attached to a piston 8. Piston 8 has a first position in which block 10 is pulled away from block 9 to open holder 1 and a second position in which block 10 is urged toward block 9 to seal holder 1. Similarly, blocks 11,12 of holder 2 may be slidingly mounted on mounting rods 20, 21 (see FIG. 4) which are attached to a piston 7. Piston 7 opens and closes holder 2. Pistons 7,8 may be hydraulically, pneumatically, or manually controlled. In one embodiment of the invention, pistons 7,8 are connected to a controller which opens and closes holder 1 and holder 2 substantially simultaneously.

FIG. 5 shows welded member 23 removed from blocks 9,10 of holder 1 and blocks 11,12 of holder 2. Welded member 23 is not removed by separating holder 1 from holder 2, as that would break the weld. Rather, welded member 23 is removed by opening blocks 9,10 and blocks 11,12. Blocks 9,10 are opened by piston 8 and blocks 11,12 are opened by piston 7.

Figure 6:
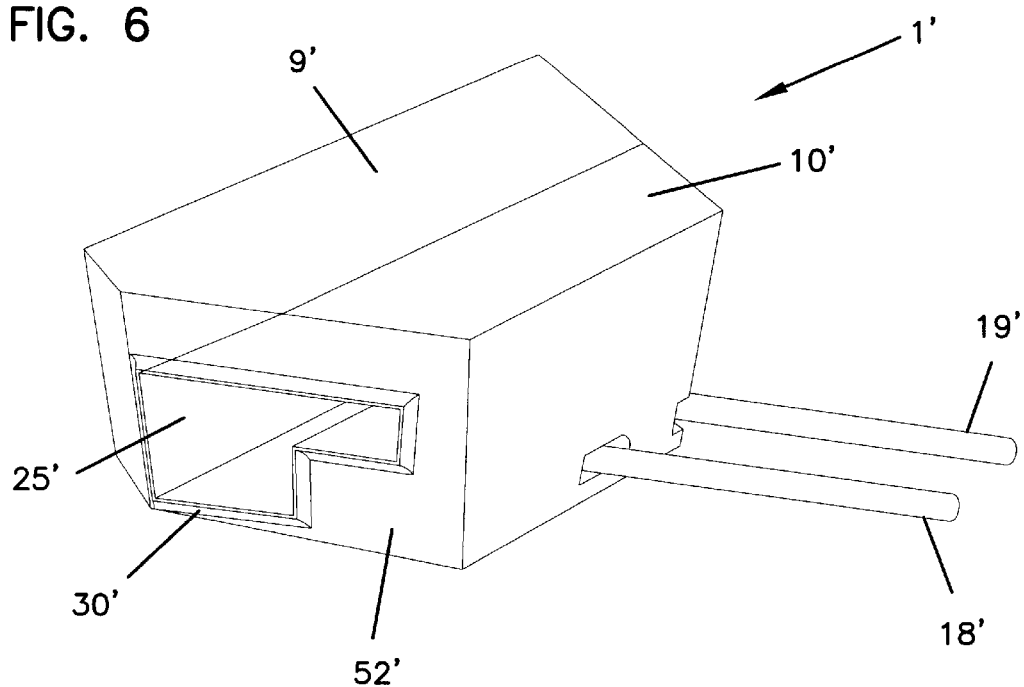
FIG. 6 is a perspective view of an embodiment of a first holder with an extension, according to the invention.
Figure 7:
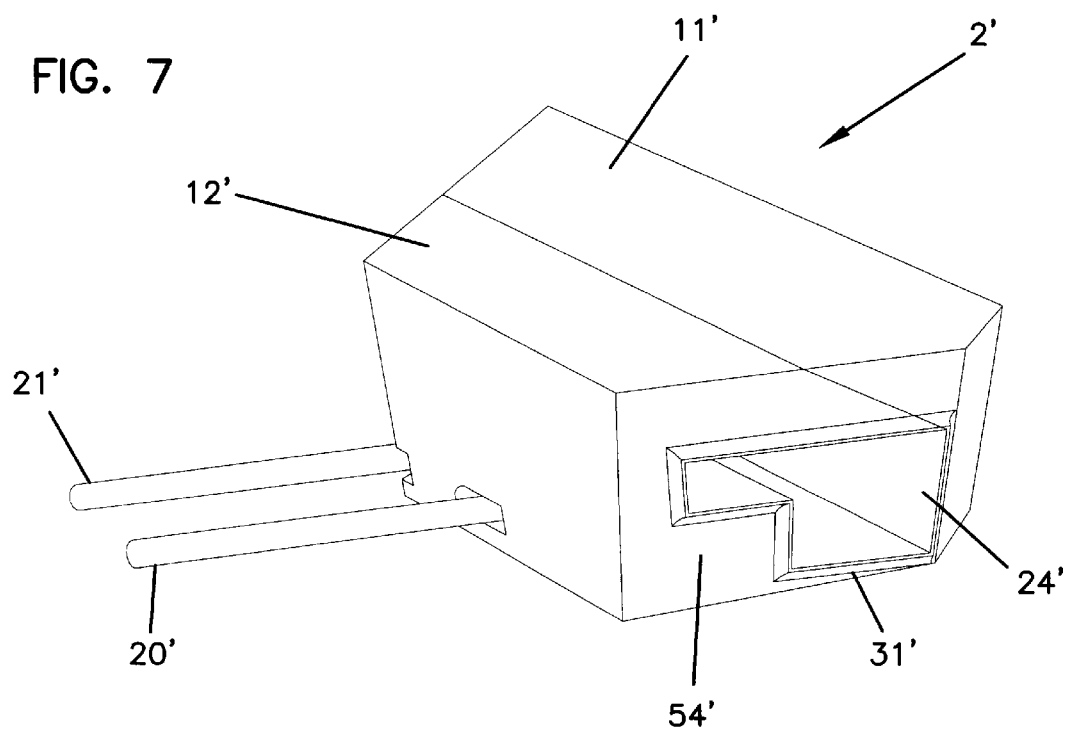
FIG. 7 is a perspective view of an embodiment of a second holder with an extension, according to the invention.
Figure 8:
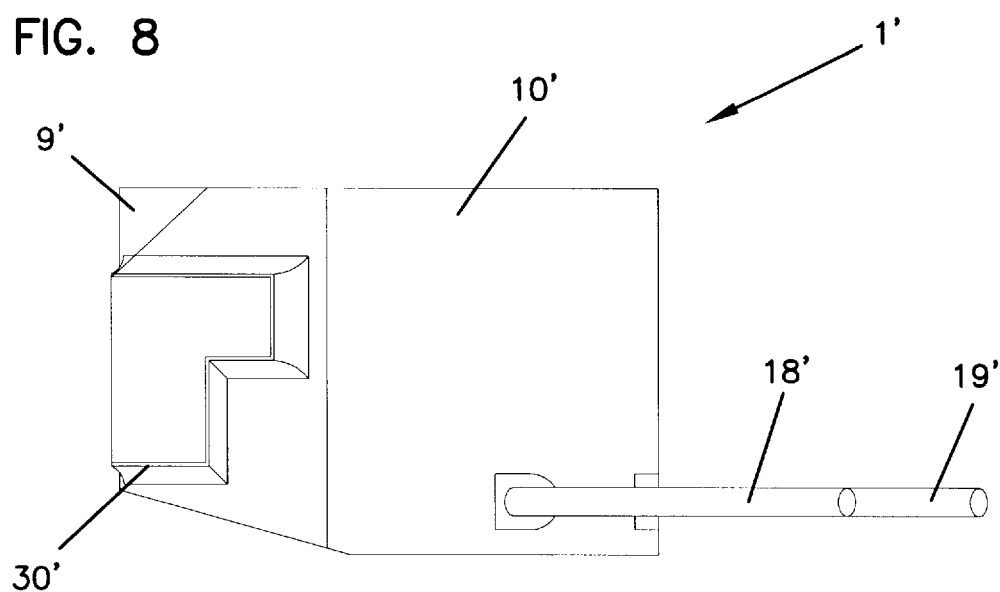
FIG. 8 is a side elevational view of the holder of FIG. 6.
Figure 9A:
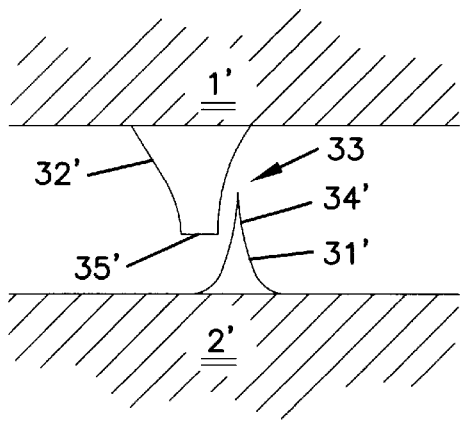
FIGS. 9A and 9B show cross-sections of two embodiments of extensions on the holders of FIGS. 6 and 7 with one (FIG. 9A) or two (FIG. 9B) cutting edges, according to the invention.
Figure 9B:
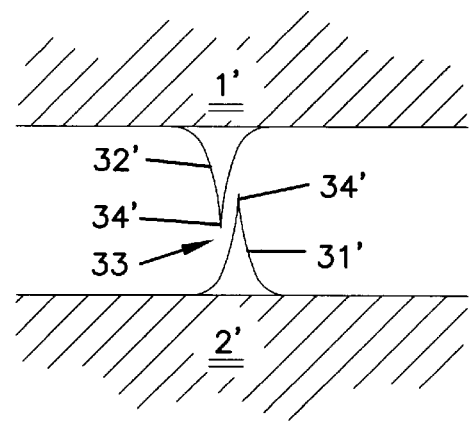
Figure 10A:
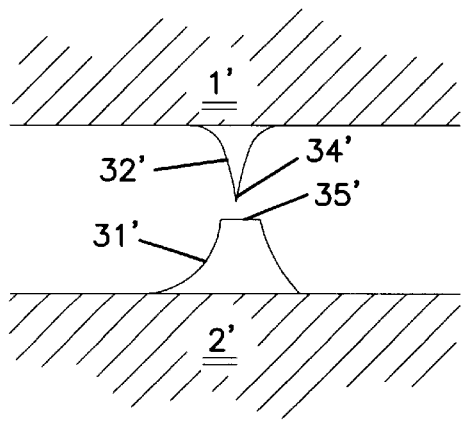
FIGS. 10A and 10B show cross-sections of two other embodiments of extensions on the holders of FIGS. 6 and 7 with one (FIG. 10A) or two (FIG. 10B) cutting edges, according to the invention.
Figure 10B:
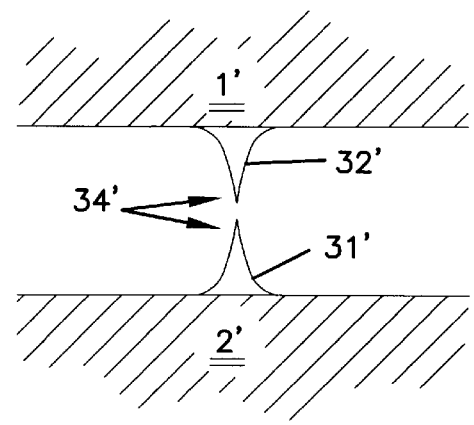

In an alternative embodiment of the first and second holders, illustrated in FIGS. 6–7, holder 1' has an extension 30' integrally formed on holder 1'. Extension 30' protrudes from face 52' and surrounds opening 25'. Holder 2' has an extension 31' integrally formed on holder 2' which protrudes from face 54' and surrounds opening 24'. FIG. 8 is a side view of holder 1' which shows that extension 30' surrounds opening 25' and is in the profile of thermoplastic member 4. Extensions 30', 31' may have a blunt head 35' or a cutting edge 34' as shown in FIGS. 9A–B and 10A–B. In some embodiments, one of extensions 30', 31' has a cutting edge 34', and the other has a blunt edge 35', as shown in FIGS. 9A,10A. Alternatively, both extensions 30', 31' have cutting edges 34', as illustrated in FIGS. 9B,10B. Cutting edges 34' are sharpened to cut flash formed during the welding of thermoplastic members 4,5.

Profiles of several embodiments of extensions 30', 31' are shown in FIGS. 9A–B and 10A–B. In the embodiments illustrated in FIGS. 9A-B, extensions 30', 31' are slightly offset to provide an overbite. By "offset," it is meant that when holders 1', 2' are brought together, one of the extensions is displaced from the other by a space 33 so that the two edges do not engage each other. Space 33 is defined as the nearest distance between adjacent edges of extensions 30', 31' In one preferred application, space 33 between cutting edges 30', 31' is about 1/1000 to about 1/16 inch and more preferably about 1/500 to about 1/100 inch.

When holders 1', 2' are brought together to weld the thermoplastic members in the holders, extension 30' passes adjacent to extension 31' so that extension 30' engages holder 2' and extension 31' engages holder 1'.

Alternatively, the cutting edges are not offset, as shown in FIGS. 10A–B, so that when holders 1', 2' are brought together, the two extensions 30', 31' engage each other. Typically, either one extension 30', 31' has a cutting edge 34' and the other extension has a blunt edge 35', as shown in FIG. 10A, or both extensions 30', 31' have cutting edges 34', as shown in FIG. 10B.

Both extensions 30', 31' and edges 34', 35' are integrally formed with their respective holders 1', 2' so that no other attachment means are necessary. Extensions 30', 31' typically extend approximately 1/16" to 1/8" beyond the face of the holder. Cutting edges on one or more of the extensions remove all of the flash from a weld so that no extra steps must be performed or other tools used to remove flash to obtain a clean joint. Because of the force necessary to clamp members 4,5, it is recommended that the cutting edge or edges 34' be made of a hard, non-corrosive material, such as tempered or stainless steel, so that they are sufficiently sharp and strong to cut the flash.

Because the shape of cutting edge or edges 34' is typically in the profile of members 4,5, all the flash surrounding the weld is removed. Deformation in the welded area is minimized because the shape of the softened ends of the members 4,5 is held intact by holders 1', 2' as the cutting edges 34' on one or more of extensions 30', 31' pinch off the flash. In some cases, however, it may not be necessary to remove the flash from all edges of the joint. In such cases, a cutting edge need only be provided along the edge of the opening where is it necessary to cut off the flash.

Returning to FIGS. 1–2, holders 1,2 are part of an apparatus 50 for forming a flash-free weld between the ends of two thermoplastic members 4,5. Holders 1,2 are mounted on a moving structure 56 configured for moving holders 1,2 toward and away from one another so that, for example, members 4,5 can be separated during heating and then moved together to form a weld. One embodiment of moving structure 56, illustrated in FIG. 2, includes a piston 15 for moving holder 1 towards holder 2 by sliding a mounting plate 26, upon which holder 1 is mounted, towards a mounting plate 6, upon which holder 2 is mounted. Piston 15 may be hydraulically, pneumatically, or manually controlled. Moreover, piston 15 may be part of moving structure 56 or may be provided as part of an external apparatus, not shown, on which moving structure 56 is mounted. This external apparatus also includes structures, such as guide rods 16,17, for positioning mounting plate 26 correctly with respect to mounting plate 6 so that a proper weld is formed. Other methods and structures may be used to position and mount moving structure 56 on an external welding apparatus.

Moving structure 56 moves holders 1,2 between a closed position, shown in FIG. 2, and an open position, shown in FIGS. 11–12. In the open position, faces 52 and 54 are spaced apart from one another. FIG. 11 shows blocks 9,10 and blocks 11,12 in an open position so that thermoplastic members can be inserted into holders 1,2. FIG. 12 shows members 4,5 clamped into holders 1,2.

When holders 1,2 are separated, a heater 22 (shown in FIGS. 11 and 12) is provided between holders 1,2 to heat thermoplastic members 4,5. As illustrated in our related application, Ser. No. 08/614,530, incorporated by reference herein, heater 22 does not touch members 4,5; rather, radiant heat from heater 22 is used to soften members 4,5 to prepare the members for forming a weld. The amount of heat needed to soften the thermoplastic members will vary depending on the material and thickness of the members, the amount of time the members are exposed to the heater, and the distance between the heater and the members. As a non-limiting, illustrative example, members made of polyvinyl chloride having a thickness of approximately 0.070 inches which are exposed for about 9–35 seconds to a heater that is about 1/4" away from the members and has a temperature between about 1100°–1500° F. should have sufficiently softened ends to produce a strong weld. Softer or thinner thermoplastic members will typically require less heat or less exposure time, and harder or thicker members will typically require a higher temperature or more exposure time.

By using a radiant heat source, the ends of members 4,5 are not contaminated by contact with the heat source. Although no particular theory with respect to this observation is asserted herein, it may be that because the ends are not contaminated, they can be welded together flash-free (i.e., the two ends can be welded together by touching the two ends together). In contrast, if the ends of the thermoplastic members are contaminated by contact with the heat source, as in conventional techniques, then significant flash is created as the contaminated material must be pushed away and removed from the weld site in order to produce a strong weld.

Many thermoplastic members are not solid structures but are characterized by a thick peripheral wall with a thin interior structure, such as bracing supports, between portions of the peripheral wall. If the same amount of heat is applied to both portions of these members, an inferior weld can result. For example, if enough heat is applied to soften the thicker peripheral walls, then the thin interior structure may soften too much, and possibly even melt, thereby damaging the structure. On the other hand, if the heating is limited to an amount which would not damage the interior structure, then the thicker peripheral wall may not soften enough resulting in a weak or flawed weld.

Figure 13:
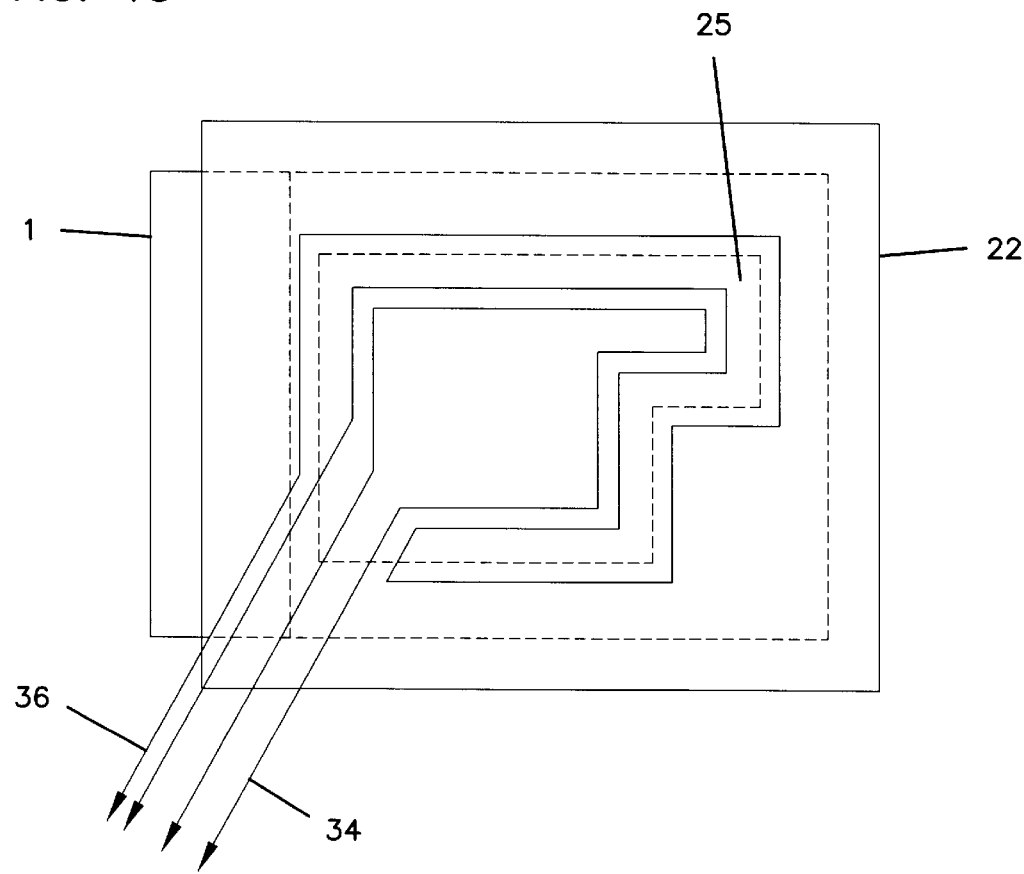
FIG. 13 is a side elevational view of a heater having a peripheral heating zone and an interior heating zone for use in heating thermoplastic members, according to the invention.

To address this problem, a heater having two or more heating zones, each zone having an independent heating element, is used in one embodiment of the invention to heat the thermoplastic members. One such heater 22 is illustrated in FIG. 13, which shows heater 22 positioned in front of holder 1 to heat a thermoplastic member held in opening 25. Heater 22 provides radiant heat to soften the ends of thermoplastic members 4,5 in holders 1,2 so that a weld can be formed. During operation, heater 22 is moved toward a position between holders 1,2 to heat members 4,5 (as shown in FIGS. 11,12). After members 4,5 are softened, heater 22 is removed so that the members can be brought together for welding. When heater 22 is between holders 1,2, it is positioned intermediate faces 24,25 of holders 1,2 and spaced a distance from members 4,5 to reduce contamination of the members that would occur if there were any contact between the heater and the members as in many current welding methods.

Heater 22 has a heating element 34 to heat the interior portion of members 4,5 and a heating element 36 to heat the peripheral portions of members 4,5. Each heating element produces heat when connected to a current source. Such heating elements are well-known in the art, and may include, for example, wires, metal bands, and heating cartridges. Furthermore, each heating element may form one or more loops within heater 22, as illustrated in FIG. 13. An independent current source may be provided for each heating element. Alternatively, a single source may be used, the amount of current provided to each heating element being electronically or manually determined. By varying the current from the current source, the amount of heat provided by the heating elements can be adjusted. For example, current through heating elements 34, 36 may be adjusted so that the peripheral portions of members 4,5 are heated to a higher temperature than the interior portions of members 4,5. Heating elements 34,36 may also be attached to a heat controller, not shown, which adjusts the current flowing through the elements based on signals received from, for example, a temperature sensor, not shown, attached to or integral with apparatus 50 or heater 22. Other embodiments of the heater may include more than two heating elements or a different configuration of the heating elements.

Figure 14:
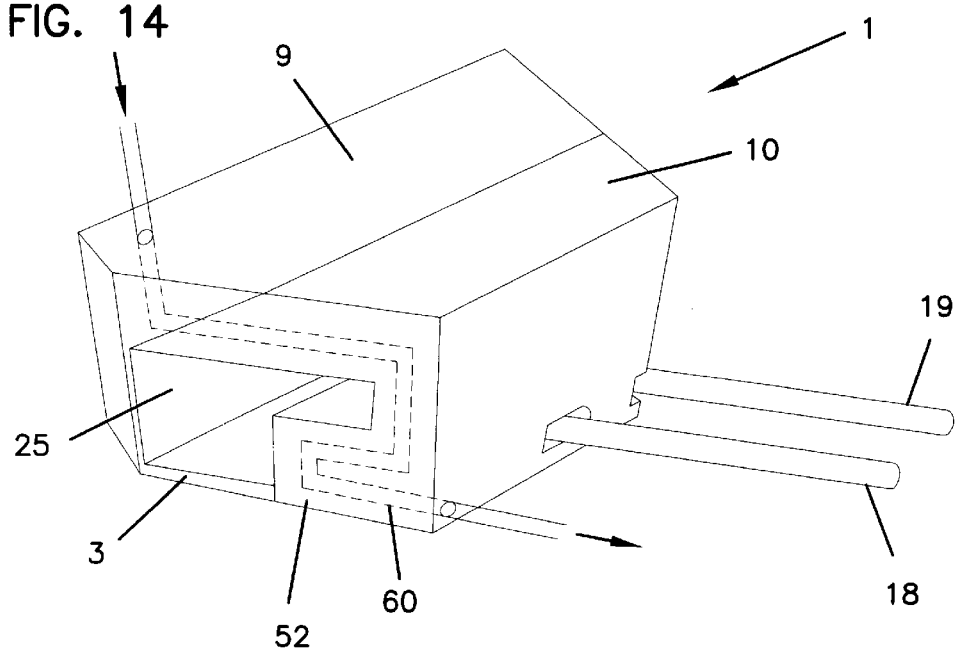
FIG. 14 is a perspective view of an embodiment of a holder with a cooling channel, according to the invention.

An alternative embodiment of holder 1 is shown in FIG. 14. This holder 1 includes a channel 60 in holder 1 through which a fluid can flow to cool holder 1 and clamped member 4. Suitable fluids include gases, such as nitrogen or air, and liquids, such as water.

Cooling the weld will decrease the cycle time for forming welds. A holder may not be unclamped until the weld has cooled sufficiently so that the weld will not deform or break upon being removed from the holder. Using a cooling mechanism, such as channel 60, may allow holders 1,2 to be unclamped sooner. To be most effective, channel 60 is provided near opening 25 and face 52. One example of such a channel configuration is shown in FIG. 14.

Cooling fluid typically flows in channel 60 after the holders are brought together to form the weld. Cooling fluid may also flow before and during formation of the weld to reduce excess heating of regions of member 4 away from the end which forms the weld. However, this will also cool, to some extent, the ends of member 4 and, therefore, a greater amount of heat from heater 22 may be needed to soften member 4. A similar channel may be provided for holder 2.

Figure 15:
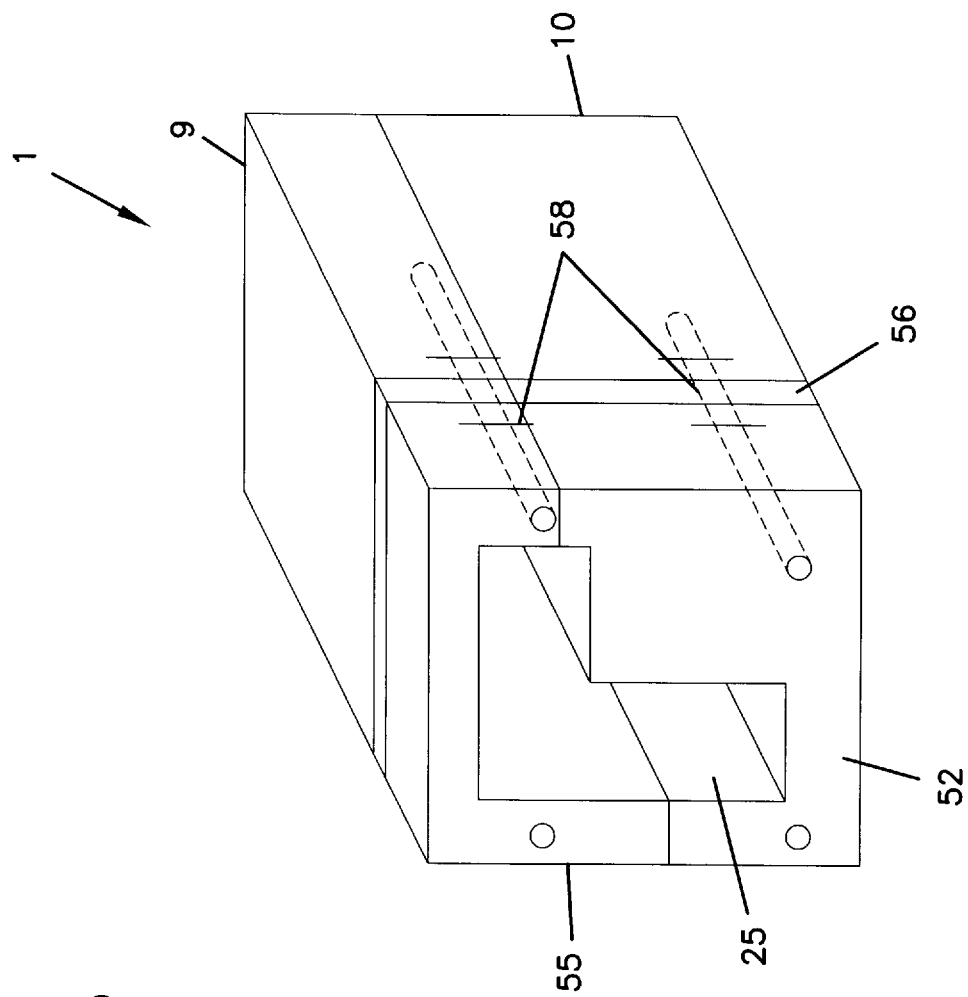
FIG. 15 is a perspective view of an embodiment of a holder with a heat deflection shield, according to the invention.

It is desirable that the heating of members 4,5 be confined, as much as possible, to the ends of members 4,5 which are to be joined. Heating of other regions of members 4,5 may damage or weaken the members. Cooling the member using channel 60 is one method of confining the heat to the ends of the members. Another way of addressing this concern is shown in FIG. 15. This embodiment of holder 1 has a heat shield 55 which is formed from portions of blocks 9 and 10. Heat shield 55 is separated from the rest of holder 1 by a thin gap 56. This gap is about ¼" to about ⅟₆₄", preferably about ³⁄₃₂" to ⅟₃₂". The size of the gap will depend on the type and thickness of the thermoplastic member. A larger gap can be used with stronger or thicker members because they will not deform when holders 1,2 are brought together. Thinner gaps should be used with soft or thin-walled members to prevent material from being pushed up into the gap as the holders are brought together.

Heat shield 55 is attached to the rest of holder 1 by connectors 58. Suitable connectors include rods, screws, and bolts. One particularly suitable connector is a spring. In one embodiment, heat shield 55 is slidingly mounted around the thermoplastic members so that when holders 1,2 are brought together, heat shield 55 may be pushed toward the rest of holder 1. The springs provide a counterforce that keeps heat shield 55 engaged with holder 2 so that no flash will develop between holders 1,2.

Heat is substantially prevented from transfer between heat shield 55 and the rest of holder 1 because there is only limited contact between these two portions of holder 1 and therefore only limited means of heat conduction. Heat shield 55 is typically about 0.25–2.0 inches wide, preferably about 0.5–1.5 inches wide, to restrict heat to a very narrow region near the end of members 4,5. Heat shield 55 is constructed from a heat-dispersing material, such as metal, to quickly remove heat from the portion of holder 1 surrounding member 4, especially after the weld has been formed. A similar heat shield may be provided for holder 2.

Another embodiment of the invention is a method for obtaining a flash-free weld between two thermoplastic members. One such method is illustrated in FIGS. 11, 12, and 2. FIG. 11 shows the apparatus in a starting position with holders 1,2 open and waiting to clamp members 4,5. Holder 1 is made of blocks 9 and 10 and holder 2 is made of blocks 11 and 12. Block 9 is mounted on a mounting plate 13 and block 11 is similarly mounted on a mounting plate 14. Plates 14 and 13 are attached to plates 6 and 26, respectively. Blocks 10 and 12 are slidingly attached to blocks 9 and 11, respectively, by rods 18,19 (see FIG. 3) and rods 20,21 (se FIG. 4), respectively. The number of rods and orientation of the rods are determined by the size and shape of the member being welded and deflashed. Member 4 is placed between blocks 9,10 and member 5 is placed between blocks 11,12 with the ends of members 4,5 extending less than ⅟₁₆" from holders 1,2. Preferably, members 4,5 are flush with the ends of holders 1,2.

FIG. 12 illustrates holders 1,2 clamping members 4,5. After member 4 is placed between blocks 9,10, piston 8 closes holder 1 by sliding block 10 along rods 18,19 until block 10 engages block 9, thus clamping member 4. After member 5 is placed between blocks 11,12, piston 7 closes holder 2 by sliding block 12 along rods 20,21 until block 12 engages block 11, thus clamping member 5. Holders 1,2 are designed such that the opening through holders 1,2 is in the profile of members 4,5, thus preventing members 4,5 from sliding when members 4,5 are clamped in holders 1,2.

After members 4,5 are clamped in holders 1,2, a heater 22 is raised between the ends of members 4,5 to soften the ends. Heater 22 may have a single heating element or may have multiple heating elements such as illustrated in FIG. 13. Typically, heater 22 is positioned intermediate holders 1,2 and spaced a distance from members 4,5 to prevent contamination of the members by contact with the heater. Heater 22 heats the ends of members 4,5 to a temperature sufficient to soften the members. This temperature will vary depending on the material and thickness of the members. For polyvinyl chloride members having a thickness of about 0.070 inches and separated from the heater by about ¼", a heater temperature of about 1100°–1500° F. applied for about 9–35 seconds should sufficiently soften the ends of the members to produce strong weld. Once the ends of members 4,5 are softened, heater 22 is removed from between the ends of members 4,5.

While the ends of members 4,5 are still soft, piston 15 moves holder 1 towards holder 2 by sliding mounting plate 26 towards mounting plate 6. After holders 1,2 move together, illustrated in FIG. 2, the softened ends of members 4,5 bond. Radiant heat is used and the resulting weld is relatively flash-free. After the weld has cooled sufficiently that the weld will not break or warp upon removal of members 4,5, which are now joined as welded piece 23, pistons 7 and 8 are engaged so that holders 1,2 are opened to allow removal of welded piece 23.

In an alternative embodiment, holders 1', 2' with extensions 30', 31' are used. The same steps described above in connection with FIGS. 11 and 12 are used. However, if extensions 30', 31' are offset, as shown in FIGS. 9A–B, extension 30' engages holder 2' and extension 31' engages holder 1', when holders 1', 2' are brought together. The one or more cutting edges 34' on extensions 30', 31' trim away the flash. If extensions 30', 31' are not offset, as shown in FIG. 10A–B, then extensions 30', 31' will instead engage each other. The impact of the one or more cutting edges 34' engaging each other, a blunt edge 35', or holders 1', 2' removes the flash to create a flash-free weld. The one or more cutting edges 34' completely cut off the flash from around the entire surface of the weld. No additional scraping is needed to remove the flash. In other words, the one or more cutting edges 34', by completely removing the flash, remove the need to perform the additional step of scraping off the flash.

The force exerted by the piston 15 is great enough that the one or more cutting edges 34' cut the flash. The force exerted by pistons 7,8 to keep members 4,5 clamped in holders 1', 2' should be great enough that members 4,5 do not slide within the holders.

The gap between holder 1' and holder 2' when they are closed together is determined by the thickness of extensions 30', 31' The gap between the faces of holders 1', 2' needs to be wide enough such that the flash is cut off and falls away. A larger gap is needed for thicker flash. Thicker flash can be formed, for example, if members 4,5 are clamped with longer portions extending beyond the face of holders 1', 2', or if members 4,5 are extruded from thicker thermoplastic. In this embodiment, recommended for 0.075" PVC members, extensions 30', 31' have a thickness of ⅛". Members 4,5 extend approximately 1/16" each beyond extensions 30', 31', respectively. Furthermore, in order to accommodate thicker extrusions, a thicker cutting edge could be used or a cutting edge could be placed on both holders 1' and 2'.

If holders 1,2 or holders 1', 2' include optional fluid channel 60 (see FIG. 14) then cooling fluid may flow through channel 60 to cool members 4,5. In one embodiment, fluid flows through channel 60 only after the weld between members 4,5 is formed to cool the weld more quickly and reduce the cycle time. Alternatively, fluid flows during at least a portion of the heating of members 4,5 by heater 22, thereby reducing the amount of heat in portions of members 4,5 away from the ends of those members. Suitable cooling fluids include gases, such as air or nitrogen, and liquids, such as water.

It will be apparent to those skilled in the art that various modifications and variations can be made in the present invention and in construction of this without departing from the scope or spirit of the invention. As an example, the inventors contemplate that holders 1, 2 could be preheated, depending on the member to be welded. Holders 1, 2 would be heated by one of several means contemplated. For example, holes could be drilled in the holders and a heater coil inserted in the holes. Alternatively, the holders could be heated by direct current resistance. Several advantages are realized by preheating the holders. For example, preheating better ensures a strength in accordance to industry standards. Furthermore, shorter cycle times would result.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for creating a flash-free weld when welding ends of thermoplastic members, comprising:

(a) placing a first thermoplastic member in a first holder, the first holder having a first face with a first opening shaped in a profile of the first member, the first face having a first extension protruding from the first face along at least a portion of the first opening, the first extension having a first cutting edge;

(b) placing a second thermoplastic member in a second holder, the second holder having a second face with a second opening shaped in a profile of the second member;

(c) positioning the first and second holders in an open position with the first face and the second face spaced apart;

(d) positioning a heater between the first and second holders and spaced apart from the first and second thermoplastic members, the heater having one or more heating zones, each zone having a heating element;

(e) radiantly heating a surface of the first member and a surface of the second member with the heater spaced apart from the first and second thermoplastic members; and (f) moving the first and second holders together, in the absence of the heater, into a closed position to weld together the heated surfaces of the first and second members and to engage the first cutting edge aid the second face to remove a flash arising from welding the first and second members.

2. The method of claim 1, wherein the second face has a second extension protruding from the second face along at least a portion of the second opening.

3. The method of claim 2, wherein the second extension has a second cutting edge.

4. The method of claim 2, wherein the step of moving the first and second holders together comprises moving the first and second holders together to engage the first cutting edge and the second extension.

5. The method of claim 1, wherein
(a) the first holder further comprises a channel for carrying cooling fluid, a portion of the channel being proximate to the first opening; and
(b) the method further comprises directing a cooling fluid through the channel to cool the heated surface of the first member after engaging the second member.

6. The method of claim 1, wherein the step of heating a surface of the first member and a surface of the second member includes heating a peripheral region of each of the surfaces using a first heating element of the heater, and heating an interior region of each of the surfaces using a second heating element of the heater.

7. The method of claim 6, wherein the peripheral region and the interior region are heated at different temperatures.

8. The method of claim 1, wherein the step of placing the first thermoplastic member in the first holder includes placing an end of the thermoplastic member substantially flush with the first face.

9. The method of claim 1, wherein:
(a) the first thermoplastic member comprises a first window frame member and the second thermoplastic member comprises a second window frame member; and
(b) the step of moving the first and second holders together comprise moving the first and second holders together so that the heated surface of the first window frame member engages the heated surface of the second window frame members to form a joint of a window frame.

10. The method of claim 1, wherein the surface of the first member and the surface of the second member are radiantly heated with a heater having a temperature of between about 1100°–1500° F.

11. The method of claim 1, wherein the first extension surrounds the first opening.

12. The method of claim 2, wherein the second extension surrounds the second opening.

13. A method for use in creating a flash-free weld when welding ends of thermoplastic members, comprising:
(a) placing a first thermoplastic member in a first holder, the first holder having a first face with a first opening shaped in a profile of the first member; the first holder including a first cutting edge protruding beyond the first face;
(b) placing a second thermoplastic member in a second holder, the second holder having a second face with a second opening shaped in a profile of the second member;
(c) positioning the first and second holders in an open position with the first face and the second face spaced apart;
(d) positioning a heater in a heating position; the heating position being between and spaced from the first and second holders;

(e) radiantly heating a surface of the first member and a surface of the second member with the heater while the heater is maintained in the heating position; the heating being accomplished without touching the first member and the second member with the heater; and
(f) moving the first holder and the second holder together, in the absence of the heater, into a closed position so that the heated surface of the first member engages the heated surface of the second member, and engaging the first cutting edge against the second face to completely remove any weld flash.

14. The method of claim 13, wherein:
(a) said step of radiantly heating includes maintaining a distance of about ¼" between the heater and the first member and the second member.

15. The method of claim 13, wherein the heater has a temperature between about 1100°–1500° F. when radiantly heating the surfaces of the first and second members.

16. A method for creating a flash-free weld when welding ends of thermoplastic members, comprising:
(a) placing a first thermoplastic member in a first holder, the first holder having a first face with a first opening shaped in a profile of the first member, the first face having a first extension protruding from the first face along at least a portion of the first opening, the first extension having a first cutting edge;
(b) placing a second thermoplastic member in a second holder, the second holder having a second face with a second opening shaped in a profile of the second member, the second face having a second extension protruding from the second face along at least a portion of the second opening, the second extension having a second cutting edge;
(c) positioning the first and second holders in an open position with the first face and the second face spaced apart;
(d) positioning a heater between the first and second holders and spaced apart from the first and second thermoplastic members, the heater having one or more heating zones, each zone having a heating element;
(e) radiantly heating a surface of the first member and a surface of the second member with the heater spaced apart from the first and second thermoplastic members; and
(f) moving the first and second holders together, in the absence of the heater, into a closed position to weld together the heated surfaces of the first and second members and to engage the first cutting edge and the second cutting edge to remove a flash arising from welding the first and second members.

17. The method of claim 15, wherein the first extension surrounds the first opening and the second extension surrounds the second opening.

18. A method for creating a flash-free weld when welding ends of thermoplastic members, comprising:
(a) placing a first thermoplastic member in a first holder, the first holder having a first face with a first opening shaped in a profile of the first member, the first face having a first extension protruding from the first face along at least a portion of the first opening, the first extension having a first cutting edge;
(b) placing a second thermoplastic member in a second holder, the second holder having a second face with a second opening shaped in a profile of the second member, the second face having a second extension protruding from the second face along at least a portion of the second opening, the second extension having a second cutting edge, the second cutting edge being offset from the first cutting edge;

(c) positioning the first and second holders in an open position with the first face and the second face spaced apart;

(d) positioning a heater between the first and second holders and spaced apart from the first and second thermoplastic members, the heater having one or more heating zones, each zone having a heating element;

(e) radiantly heating a surface of the first member and a surface of the second member with the heater spaced apart from the first and second thermoplastic members; and (f) moving the first and second holders together, in the absence of the heater, into a closed position to weld together the heated surfaces of the first and second members and to engage (i) the first cutting edge and the second face and (ii) the second cutting edge and the first face to remove a flash arising from welding the first and second members.

19. The method of claim 11, wherein the first extension surrounds the first opening and the second extension surrounds the second opening.

* * * * *